United States Patent [19]

Kato

[11] Patent Number: 5,651,588

[45] Date of Patent: Jul. 29, 1997

[54] BOLT FASTENING STRUCTURE FOR EASILY FASTENING BOLTS

[75] Inventor: Yoshihisa Kato, Aichi-Ken, Japan

[73] Assignee: Toyota Jidosha Kabushiki Kaisha, Aichi-ken, Japan

[21] Appl. No.: 637,339

[22] Filed: Apr. 25, 1996

[30] Foreign Application Priority Data

Jul. 19, 1995 [JP] Japan ................... 7-182902

[51] Int. Cl.$^6$ ........................... B60B 27/00
[52] U.S. Cl. ................... 301/35.62; 301/105.1; 301/114; 411/537
[58] Field of Search ................ 301/6.1, 35.57, 301/35.62, 105.1, 111, 114; 411/537, 538, 539; 29/894.321, 894.361

[56] References Cited

U.S. PATENT DOCUMENTS

| 2,053,478 | 9/1936 | Horton | 301/35.62 X |
| 3,313,197 | 4/1967 | Knohl | 411/537 X |
| 4,440,451 | 4/1984 | Goodell et al. | 301/105.1 |
| 5,031,967 | 7/1991 | Svensson | 301/105.1 |
| 5,181,817 | 1/1993 | Anderson | 411/539 X |
| 5,209,701 | 5/1993 | Ishikawa et al. | 301/105.1 X |
| 5,490,720 | 2/1996 | Archibald | 301/35.62 |

FOREIGN PATENT DOCUMENTS

| 1556381 | 2/1969 | France | 411/538 |
| 9167301 | 9/1984 | Japan | 301/35.62 |
| 62-31502 | 2/1987 | Japan . | |

*Primary Examiner*—Russell D. Stormer
*Attorney, Agent, or Firm*—Oliff & Berridge

[57] ABSTRACT

A bolt-fastened structure includes a supporting member having a through-hole, and a bolt fitted in the through-hole of the supporting member. The supporting member includes at least one of a first notch provided to partially enlarge an opening edge of the through-hole at one side of the through-hole, and a second notch provided to partially enlarge another opening edge of the through-hole at opposite side of the through-hole. The first notch and the second notch are symmetrically located with respect to a central point of the through-hole.

10 Claims, 4 Drawing Sheets

BOLT FASTENING STRUCTURE FOR EASILY FASTENING BOLTS

BACKGROUND OF THE INVENTION

(1) Field of the Invention

The present invention generally relates to a bolt-fastened structure, and more particularly to a bolt-fastened structure of a supporting member which fastens a wheel of an automotive vehicle to an axle hub by tightening nuts to hub bolts fitted in through holes of the axle hub.

(2) Description of the Related Art

A bolt-fastened structure of an axle hub of an automotive vehicle which is used to fasten a disc wheel to the axle hub by using bolts and nuts, is known. Japanese Laid-Open Utility Model Application No.62-31502 discloses a bolt-fastened structure of this type.

In the bolt-fastened structure of the above-mentioned publication, hub bolts are fitted in through-holes of the axle hub, and nuts are tightened to the hub bolts to fasten the disc wheel to the axle hub. In this bolt-fastened structure, each hub bolt has a serrated neck portion, the serrated neck portion being formed on the outer periphery of the hub bolt below a head of the hub bolt. When the hub bolts are fitted in the through-holes of the axle hub, the serrated neck portion of each hub bolt serves to prevent a rotation of the hub bolt relative to the axle hub by a tightening torque needed to tighten the nut to the hub bolt.

If a self-locking resistance of the serrated neck portion of the hub bolt to the axle hub is not greater than the tightening torque, the hub bolt is loosely rotated, together with the nut, relative to the axle hub by the tightening torque on the nut, and it is difficult to firmly fasten the disc wheel to the axle hub. In the structure of the above publication, since the hub bolt has the serrated neck portion, the hub bolt can be firmly fitted to the axle hub, and the nut can be tightened to the hub bolt effectively to secure the disc wheel to the axle hub.

On the other hand, it is desired that a maintenance operation to replace the hub bolts on the axle hub of the automotive vehicle can be easily performed in the field. One of measures to facilitate the maintenance operation is to widen an insertion space that the hub bolts can be inserted into the through-holes of the axle hub without interfering to other parts of the vehicle surrounding the axle hub.

To widen the insertion space for the hub bolts within the vehicle, it is conceivable that an insertion angle at which the hub bolt can be inserted into the through-hole of the axle hub is enlarged. To enlarge the insertion angle of the hub bolt to the through-hole, it is necessary to enlarge or cut opening edges of the through-hole at both sides. For this purpose, the opening edges of the through-hole at both sides are chamfered.

However, if the entire periphery of each of the opening edges of the through hole is chamfered to be wide enough to enlarge the insertion angle of the hub bolt, a fitting area between the inner peripheral wall of the through-hole and the outer peripheral portion of the hub bolt (the serrated neck portion) where the hub bolt is fitted to the axle hub is considerably reduced due to the length of the chamfered portions of the through hole. Since the fitting area between the through-hole and the hub bolt is considerably reduced in such a case, the hub bolt is likely to be loosely rotated, together with the nut, relative to the axle hub when the nut is tightened to the hub bolt. Therefore, it is difficult to avoid the lowering of the self-locking resistance of the hub bolt to the axle hub if the chamfering of the opening edges of the through-hole is performed to enlarge the insertion angle of the hub bolt.

Accordingly, in the case of the structure of the above publication, it is difficult to facilitate the replacement of the bolt of the supporting member as well as avoid the lowering of the self-locking resistance of the bolt to the supporting member below the tightening torque of the nut.

SUMMARY OF THE INVENTION

An object of the present invention is to provide an improved bolt-fastened structure in which the above-described problems are eliminated.

Another object of the present invention is to provide a bolt-fastened structure of a supporting member which allows the replacement of the bolts on the supporting member to be easily performed and does not make the self-locking resistance of the bolts to the supporting member smaller than the tightening torque needed to tighten the nuts to the bolts.

The above-mentioned objects of the present invention are achieved by a bolt-fastened structure which includes a supporting member having a through-hole, and a bolt fitted in the through-hole of the supporting member, the supporting member including at least one of a first notch which partially cuts an opening edge of the through-hole at one side of the through-hole, and a second notch which partially cuts another opening edge of the through-hole at opposite side of the through-hole, the first notch and the second notch being symmetrically located with respect to a central point of the through-hole.

In the bolt-fastened structure of the present invention, the opening edges of the through-hole at both sides are partially cut by the first and second notches, and thus, the lowering of the self-locking resistance of the bolt to the supporting member can be prevented. The fitting area between the bolt and the through-hole adequate for resisting to the tightening torque can be produced by the first and second notches of the present invention. In addition, in the bolt-fastened structure of the present invention, the first notch and the second notch are symmetrically located with respect to the central point of the through hole, and thus, it is possible to effectively enlarge the insertion angle of the bolt to the through-hole so that the replacement of the bolt of the supporting member can be easily performed.

BRIEF DESCRIPTION OF THE DRAWINGS

The above and other objects, features and advantages of the present invention will become more apparent from the following detailed description when read in conjunction with the accompanying drawings in which.

DESCRIPTION OF THE PREFERRED EMBODIMENTS

A description will now be given of the preferred embodiments of the present invention with reference to the accompanying drawings.

Figure 1:
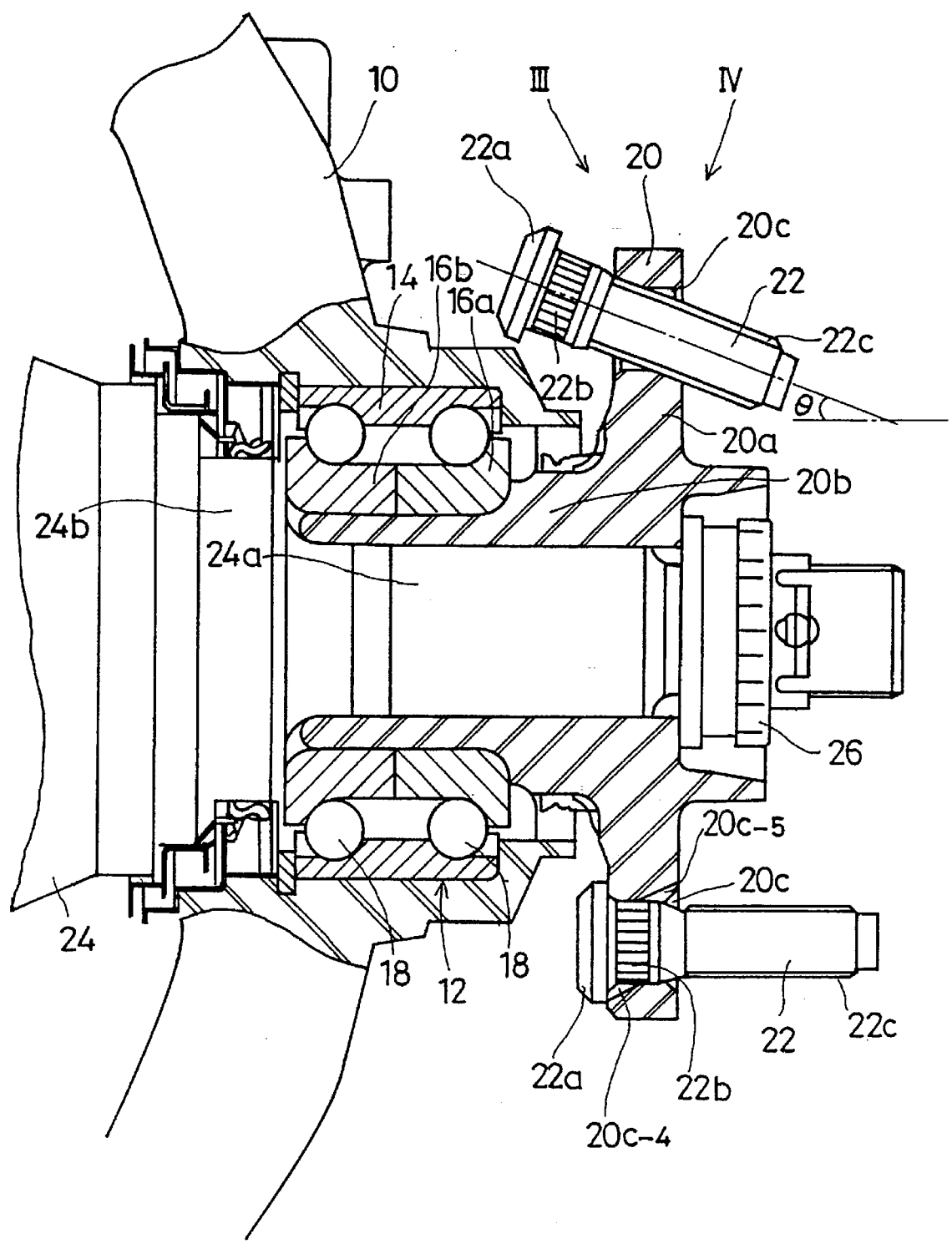
FIG. 1 is a cross-sectional view of an axle hub of an automotive vehicle to which a bolt-fastened structure in one embodiment of the present invention is applied.

FIG. 1 shows an axle hub 20 of an automotive vehicle to which a bolt-fastened structure in one embodiment of the present invention is applied.

Referring to FIG. 1, a knuckle 10 is a rigid member which is a part of a suspension unit. The axle hub 20 is a supporting member in present embodiment. The knuckle 10 is connected to a vehicle body through a ball joint (not shown) and a suspension arm (not shown). A bearing unit 12 is provided between the inner walls of the knuckle 10.

The bearing unit 12 includes an outer race 14, a pair of inner races 16a and 16b, and a number of balls 18 disposed between the outer race 14 and the inner races 16a and 16b. The outer race 14 is press-fitted to the knuckle 10, and the inner races 16a and 16b are press-fitted to the axle hub 20. By the bearing unit 12, the axle hub 20 is rotatably supported on the knuckle 10.

The axle hub 20 is a rigid member which includes a flange 20a and a shaft portion 20b. In the flange 20a of the axle hub 20, four or five through-holes 20c are formed at circumferential locations of the flange 20a, the through-holes 20c equally spaced about the central axis of the shaft portion 20b. Hub bolts 22 are respectively fitted to inner walls of the through-holes 20c of the axle hub 20 so that the hub bolts 22 are fixed to the axle hub 20.

The shaft portion 20b of the axle hub 20 is hollow. A first portion 24a of a drive shaft 24 is inserted in the hollow space inside the shaft portion 20b. The drive shaft 24 includes the first portion 24a and a second portion 24b. The second portion 24b has a diameter greater than a diameter of the first portion 24a. A lock nut 26 is fastened to a leading edge of the first portion 24a such that the drive shaft 24 and the axle hub 20 are fixed to each other. In the secured condition, a side wall of the second portion 24b of the drive shaft 24 is pressed onto a side wall of the inner race 16b of the bearing unit 12.

Each of the hub bolts 22 which are fitted in the through-holes 20c of the axle hub 20 includes a head 22a, a serrated neck portion 22b, and a threaded portion 22c. The hub bolts 22 are inserted into the through-holes 20c of the axle hub 20 from the side of the knuckle 10, and the hub-bolts 22 are press-fitted to the through-holes 20c until the head 22a of each hub bolt comes into contact with the axle hub 20. In a condition of the axle hub 20 in which the hub bolts 22 are suitably fitted in the through-holes 20c, the serrated neck portion 22b of each hub bolt is fitted to the inner peripheral wall of the through-hole 20c.

In FIG. 1, the upper one of the two hub bolts 22 indicates an intermediate condition of the hub bolt in the course of the insertion into the through-hole 20c, and the lower one of the hub bolts 22 indicates a suitably-fitted condition of the hub bolt when it is completely fitted in the through-hole 20c.

A wheel (not shown) of the automotive vehicle is attached to the above axle hub 20 shown in FIG. 1, by placing bolt holes of the wheel into the hub bolts 22 of the axle hub 20. Further, in such a condition, nuts are fastened to the threaded portions 22c of the hub bolts 22, so that the wheel is secured to the axle hub 20.

Hereinafter, the right side of the axle hub 20 of FIG. 1 to which the wheel is secured is referred to as the wheel-side, and the left side of the axle hub 20 of FIG. 1 to which the drive shaft 24 is connected is referred to as the body-side, for the sake of convenience.

In the bolt-fastened structure of the present invention, the configuration of the through-hole 20c of the axle hub 20 provides advantageous features of the present invention. A description will be given of the configuration of the through-hole 20c of the axle hub 20 with reference to FIGS. 2, 3 and 4.

Figure 2:
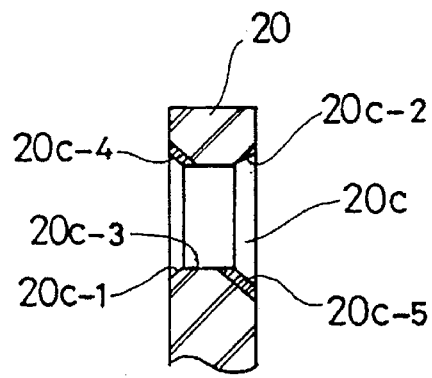
FIG. 2 is a cross-sectional view of the bolt-fastened structure of the above embodiment adjacent to the through-hole of the axle hub.
Figure 3:
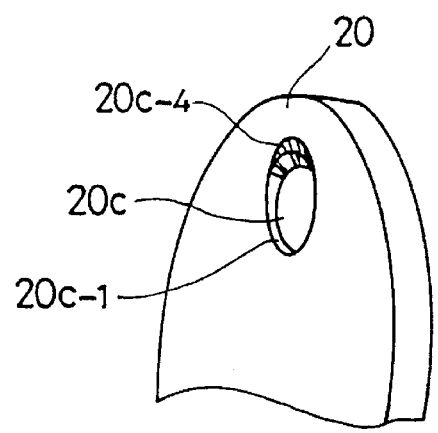
FIG. 3 is a perspective view of the bolt-fastened structure of the above embodiment from a body-side indicated by an arrow III in FIG. 1.
Figure 4:
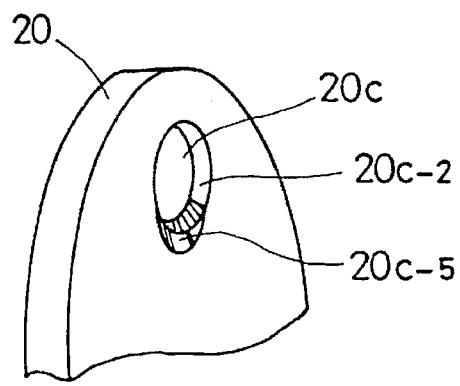
FIG. 4 is a perspective view of the bolt-fastened structure of the above embodiment from a wheel-side indicated by an arrow IV in FIG. 1.

FIG. 2 is a cross-sectional view of the bolt-fastened structure of the present embodiment adjacent to the through-hole 20c of the axle hub 20. FIG. 3 is a perspective view of the bolt-fastened structure of the present embodiment from the body-side indicated by an arrow III in FIG. 1. FIG. 4 is a perspective view of the bolt-fastened structure of the present embodiment from the wheel-side indicated by an arrow IV in FIG. 1.

Referring to FIGS. 2, 3 and 4, the bolt-fastened structure adjacent to the through-hole 20c of the axle hub includes chamfered portions 20c-1 and 20c-2 at the opening edges of the through-hole at both sides thereof. The bolt-fastened structure includes a fitting area 20c-3 between the chamfered portions 20c-1 and 20c-2. Further, the bolt-fastened structure includes a first notch 20c-4 which partially cuts the opening edge of the through-hole 20c at one side and a second notch 20c-5 which partially cuts the opening edge of the through-hole 20c at the opposite side.

The fitting area 20c-3 is an area where the serrated neck portion 22b of the hub bolt 22 and the inner peripheral wall of the through-hole 20c are fitted to each other. An inside diameter of the fitting area 20c-3 is slightly smaller than an outside diameter of the serrated neck portion 22b before the above-mentioned fitting.

The chamfered portions 20c-1 and 20c-2 are formed so that they have a smallest possible width to remove burrs at the opening edges of the through-hole 20c. The chamfered portions 20c-1 and 20c-2 serve to enlarge the opening edges of the through-hole 20c and to make the insertion of the hub bolt 22 into the through-hole 20c easier.

As shown in FIGS. 2 and 3, the first notch 20c-4 in this embodiment is formed so as to partially enlarge the body-side opening edge of the through-hole 22c toward the outer periphery of the axle hub 20. The outermost region of the chamfered portion 20c-1 located at the side of the outer periphery of the axle hub 20 is further chamfered to form this first notch 20c-4.

As shown in FIGS. 2 and 4, the second notch 20c-5 in this embodiment is formed so as to partially enlarge the wheel-side opening edge of the through-hole 22c toward the inner periphery of the axle hub 20. The innermost region of the chamfered portion 20c-2 located at the side of the inner periphery of the axle hub 20 is further chamfered to form this second notch 20c-5.

In the bolt-fastened structure of the present embodiment, the formation of the first and second notches 20c-4 and 20c-5 may be performed at the same time that a forging or casting is performed to form a blank of the axle hub 20 during the production. Alternatively, the formation of the first and second notches 20c-4 and 20c-5 may be performed by machining after the blank of the axle hub 20 has been produced by the forging or casting.

In the bolt-fastened structure of the present embodiment, the bearing unit 12 is arranged within the knuckle 10 at the body-side of the axle hub 20, as shown in FIG. 1. A projecting portion of the knuckle 10 in which the bearing unit 12 is arranged is located near the flange 20a of the axle hub 20. Since the portion of the knuckle 10 exists at such a location, it is impossible to insert the hub bolts 22 into the through holes 20c in horizontal directions which are parallel to the central axis of each through-hole 20c. However, the necessity of the insertion of the hub bolts 22 into the through holes 20c occurs during a maintenance operation for the replacement purpose.

In order to insert the hub bolts 22 into the though-holes 20c, it is necessary to avoid the interference between the head 22a and the projecting portion of the knuckle 10. Thus, as indicated by the upper one of the hub bolts 22 in FIG. 1, it is necessary that the hub bolt 22 be inserted into the through-hole 22c in a slanting direction which is at an angle "Θ" to the central axis of the through hole 20c.

Each hub bolt 22 has the threaded portion 22c the outside diameter of which is smaller than the outside diameter of the serrated neck portion 22b. The fitting area 20c-3 within each through-hole 20c has an inside diameter which is substantially the same as the outside diameter of the serrated neck portion 20c-3. When inserting the hub bolt 22 into the through-hole 20c, there is a certain amount of space between the outer periphery of the hub bolt 22 and the inner periphery of the through-hole 20c. Accordingly, in the present embodiment, the hub bolt 22 can be inclined at the angle "Θ" to the central axis of the through-hole 20c while it is inserted into the through-hole 20c.

Figure 5:
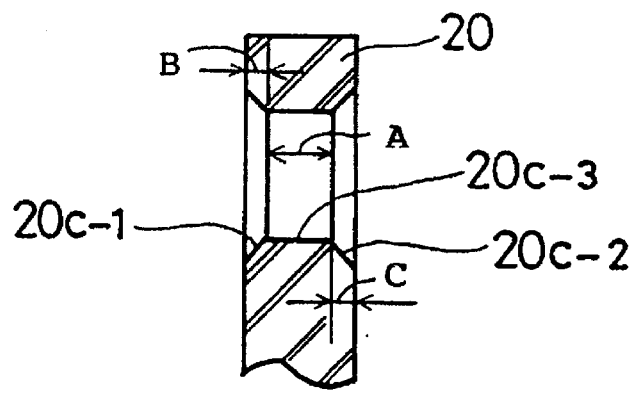
FIG. 5 is a diagram showing dimensions of the through-hole of the axle hub.

FIG. 5 shows dimensions of the through-hole 20c of the axle hub 20. In FIG. 5, "A" indicates a width of the fitting area 20c-3, "B" indicates a width of the chamfered portion 20c-1, and "C" indicates a width of the chamfered portion 20c-2. To enlarge the insertion angle permitted for the hub bolt 22 to be inserted into the through-hole 20c, it may be effective to reduce the width A of the fitting area 20c-3 and enlarge the widths B and C of the chamfered portions 20c-1 and 20c-2.

However, if the width A is reduced, the area where the serrated neck portion 22b of the hub bolt 22 is fitted to the fitting area 20c-3 of the through-hole is reduced. In such a condition, it is difficult to provide the self-locking resistance of the hub bolt 22 adequate for resisting to the tightening torque needed to tighten the nut to the hub bolt 22.

When fastening the wheel to the axle hub 20, the nuts are tightened to the hub bolts 22 fitted in the through holes 20c of the axle hub 20. If the self-locking resistance of each hub bolt is not adequate, it is likely that the hub bolts 22 are rotated relative to the axle hub 20 together with the nuts due to the tightening torque.

In the bolt-fastened structure of the present embodiment, the axle hub 20 includes the first notch 20c-4 and the second notch 20c-5 which partially cut or enlarge the opening edges of the through-hole 20c at both sides.

Figure 6:
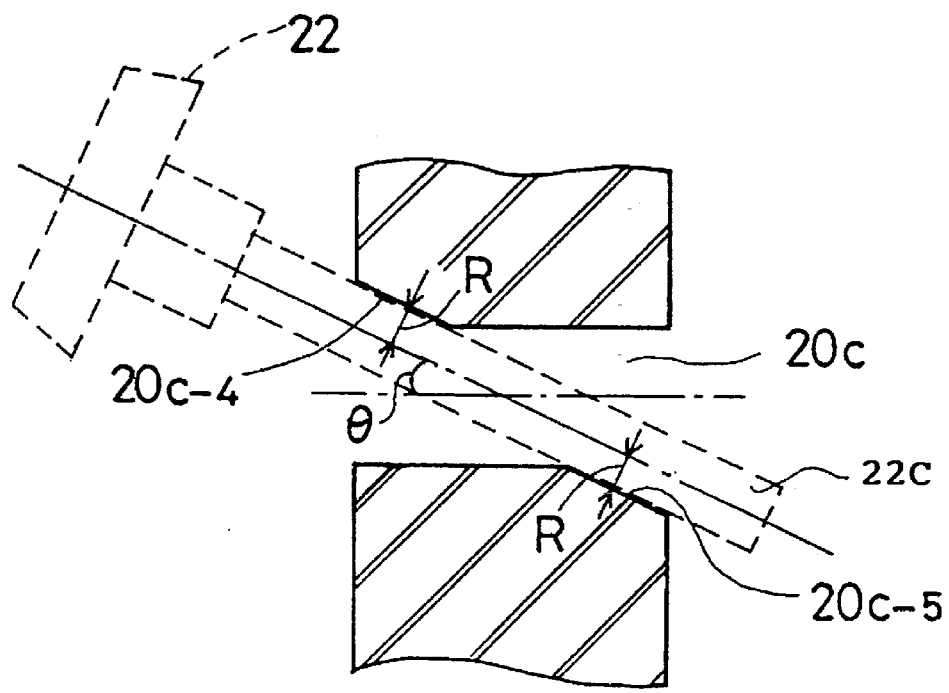
FIG. 6 is a diagram for explaining a first notch and a second notch which are formed at opening edges of the through-hole of the axle hub.

FIG. 6 shows the first notch 20c-4 and the second notch 20c-5 which are formed at the opening edges of the through-hole 20c of the axle hub 20. Referring to FIG. 6, the first notch 20c-4 and the second notch 20c-5 are symmetrically located with respect to the central point of the through-hole 20c.

As shown in FIG. 6, the first notch 20c-4 has a cross-section wherein the outside diameter of the threaded portion 22c of the hub bolt 22 is enclosed by the inside wall of the first notch 20c-4, and the second notch 20c-5 has a cross-section wherein the outside diameter of the threaded portion 22c of the hub bolt 22 is enclosed by the inside wall of the second notch 20c-5.

As shown in FIG. 6, the first notch 20c-4 and the second notch 20c-5 are arranged such that, when inserting the hub bolt 22 into the through-hole 20c in the slanting direction (which is at the angle Θ to the central axis of the through-hole 20c), both a distance between the central axis of the hub bolt 22 and an outermost point of the first notch 20c-4 in the axle hub 20 and a distance between the central axis of the hub bolt 22 and an innermost point of the second notch 20c-5 in the axle hub 20 are greater than a radius "R" of the threaded portion 22c of the hub bolt 22.

Accordingly, in the present embodiment, it is possible that the insertion angle (the angle Θ in FIG. 6) permitted for the hub bolt 22 to be inserted into the through-hole 20c is enlarged, and, at the same time, the area where the hub bolt 22 is fitted in the fitting area 20c-3 of the through hole 20c is not considerably reduced. For this reason, the bolt-fastened structure of the present embodiment can provide the self-locking resistance of the hub bolt 22 adequate for resisting to the tightening torque needed to tighten the nut to the hub bolt 22. Therefore, the present embodiment can prevent the rotation of the hub bolts 22 relative to the axle hub 20 due to the tightening torque of the nuts. In other words, when fastening the wheel to the axle hub 20, the nuts can safely be tightened to the hub bolts 22 fitted in the through holes 20c of the axle hub 20.

Further, the bolt-fastened structure of the present embodiment will facilitate the design of a bearing unit having a greater size, the arrangement of the bearing unit near the flange 20a of the axle hub 20, and the design of an axle hub flange having a smaller width.

In the above-described embodiment, the hub bolt 22 has the serrated neck portion 22b in order to provide an adequate level of the self-locking resistance of the hub bolt 22 fitted in the through-hole 22c. However, the present invention is not limited to this embodiment. There are other methods of obtaining an adequate level of the self-locking resistance of the hub bolt 22. For example, a variation of the present embodiment is conceivable wherein the inner periphery of the through-hole 20c have a serrated portion instead of the serrated neck portion 22b, or another variation wherein each of the outer periphery of the hub bolt 22 and the inner periphery of the through-hole 20c have a serrated portion.

In the present embodiment, the axle hub 20 corresponds to the supporting member and one of the hub bolts 22 corresponds to the bolt. The bolt-fastened structure of the present embodiment is used for the axle hub of the automotive vehicle to which the hub bolts 22 are fitted. However, the present invention is not limited to this embodiment, and variations may be made without departing from the scope of the present invention.

Next, a description will be given of a bolt-fastened structure in another embodiment of the present invention with reference to FIGS. 7 and 8.

Figure 7:
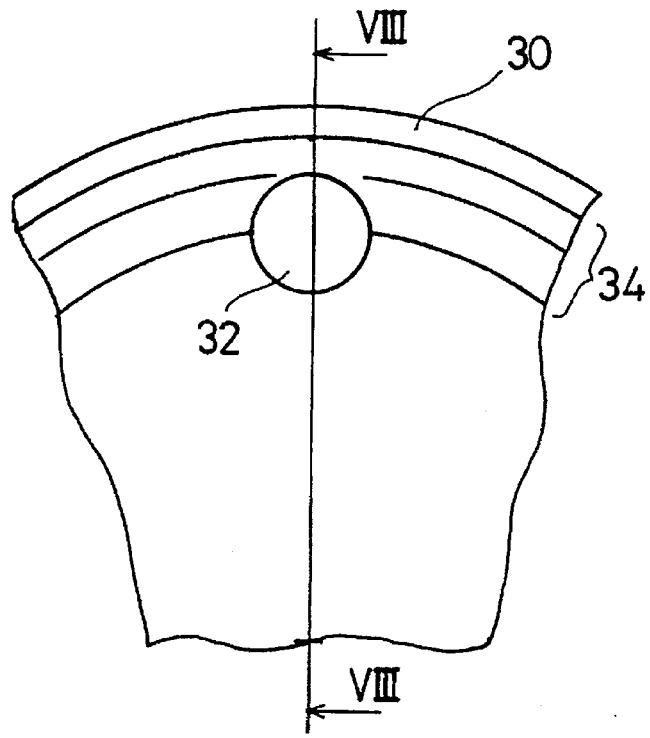
FIG. 7 is a diagram of an axle hub of an automotive vehicle to which a bolt-fastened structure in another embodiment of the present invention is applied.

FIG. 7 shows an axle hub 30 of an automotive vehicle to which another embodiment of the present invention is applied. FIG. 8 is a cross-sectional view of the axle hub 30 taken along a line VIII—VIII in FIG. 7.

Figure 8:
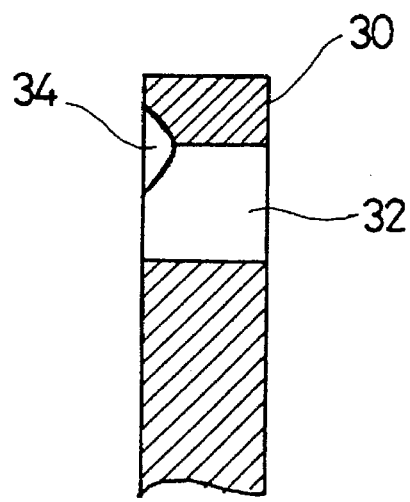
FIG. 8 is a cross-sectional view of the bolt-fastened structure of the above embodiment taken along a line VIII—VIII in FIG. 7.

Referring to FIGS. 7 and 8, the axle hub 30 is produced from a blank which is formed by casting or forging The axle hub 30 includes an annular groove 34 formed at the entire peripheral portion of the axle hub 30. The annular groove 34 is formed in the course of the casting or forging process to form the blank of the axle hub 30. A through-hole 32 in the axle hub 30 is formed by machining of the blank of the axle hub 30 after the annular groove 34 is formed.

In the present embodiment, the through-hole 32 and the annular groove 34 are arranged such that an outer-side half portion of the through-hole 32 and an inner-side half portion of the annular groove 34 overlap each other, as shown in FIGS. 7 and 8.

The annular groove 34 in the present embodiment has a V-shaped cross-section in which a bottom point of the annular groove 34 coincides with the location of the outermost peripheral wall of the through-hole 32, as shown in FIG. 8.

In the present embodiment, the axle hub 30 corresponds to the supporting member, and the annular groove 34 corresponds to at least one of the first notch and the second notch.

In the present embodiment, as shown in FIGS. 7 and 8, the axle hub 30 has the annular groove 34 formed at only one side of the through-hole 32. However, in order to facilitate the replacement of the bolts on the axle hub 30, a variation of the present embodiment is conceivable to use a bolt-fastened structure wherein the axle hub has annular grooves 34 formed at both sides of the through-hole, one of the annular grooves 34 being arranged such that the outer-side half portion of the through-hole 32 and the inner-side half portion of that annular groove overlap each other, and the other one being arranged such that an inner-side half portion of the through-hole 32 and an outer-side half portion of the other annular groove 34.

As described above, since the through-hole 32 in the axle hub 30 can be formed by machining of the blank of the axle hub 30 after the formation of the annular groove 34, the present embodiment provides a supporting member including at least one notch which partially cuts one of the opening edges of the through-hole 32. Therefore, the bolt-fastened structure of the present embodiment allows the replacement of the bolts on the axle hub 30 to be easily performed and does not make the self-locking resistance of the bolt to the axle hub 30 smaller than the tightening torque needed to tighten the nuts to the bolts. Also, in the present embodiment, it is not necessary to increase the number of processes needed to produce the axle hub 30.

What is claimed is:

1. A bolt-fastened structure, comprising:
   a supporting member having a through-hole and first and second sides, said through-hole having a central axis and an opening edge at each of the first and second sides of the supporting member, said supporting member including at least one of a first notch at the opening edge of the through-hole at the first side of the supporting member and a second notch at the opening edge of the through-hole at the second side of the supporting member; and
   a bolt fitted in the through-hole of the supporting member, the bolt having a central axis and a threaded portion, the threaded portion having a radius;
   wherein said first notch and said second notch are symmetrically located with respect to the central axis of the through-hole, and said supporting member further including a first chamfered portion located on the first side of the supporting member and a second chamfered portion located on the second side of the supporting member.

2. The bolt-fastened structure according to claim 1, wherein said first notch has an inside wall and a cross-section in which an outside surface of the bolt contacts the inside wall of the first notch, and said second notch has an inside wall and a cross-section in which the outside surface of the bolt contacts the inside wall of the second notch.

3. The bolt-fastened structure according to claim 1, wherein said first notch has an outermost point and said second notch has an innermost point, and said first notch and said second notch are arranged such that, when inserting the bolt into the through-hole in a slanting direction at an angle to the central axis of the through-hole, both a distance between the central axis of the bolt and the outermost point of the first notch in the supporting member and a distance between the central axis of the bolt and the innermost point of the second notch in the supporting member are greater than the radius of the threaded portion of the bolt.

4. The bolt-fastened structure according to claim 1, wherein said first chamfered portion has an outermost point and said first notch is provided at the outermost point of the first chamfered portion.

5. The bolt-fastened structure according to claim 1, wherein said second chamfered portion has an innermost point and said second notch is provided at the innermost point of the second chamfered portion.

6. The bolt-fastened structure according to claim 1, wherein said supporting member includes an annular groove, and said at least one of said first notch and said second notch is constituted by a portion of said annular groove.

7. The bolt-fastened structure according to claim 1, wherein said bolt has a serrated neck portion, said serrated neck portion having an outside diameter greater than an inside diameter of said through-hole.

8. The bolt-fastened structure according to claim 1, wherein the threaded portion of the bolt has an outside surface which contacts the inner wall of both said first notch and said second notch.

9. The bolt-fastened structure according to claim 1, wherein said supporting member comprises an axle hub of an automotive vehicle.

10. A bolt-fastened structure, comprising:
    a supporting member having a through-hole and first and second sides, said through-hole having a central axis and an opening edge at each of the first and second sides of the supporting member, the opening edge at the first side of the supporting member including at least one of a first notch at the opening edge of the through-hole at the first side of the supporting member and a second notch at the opening edge of the through-hole at the second side of the supporting member, the first notch having an outermost point and an inside wall, and the second notch having an innermost point and an inside wall; and
    a bolt fitted in the through-hole of the supporting member, the bolt having a central axis and a threaded portion, the threaded portion having a radius;
    wherein said first notch and said second notch are symmetrically located with respect to the central axis of the through-hole, and said first notch and said second notch are arranged such that, when inserting the bolt into the through-hole in a slanting direction at an angle to the central axis of the through-hole, both a distance between the central axis of the bolt and the outermost point of the first notch in the supporting member and a distance between the central axis of the bolt and the innermost point of the second notch in the supporting member are greater than the radius of the threaded portion of the bolt.

* * * * *